Figure 1:
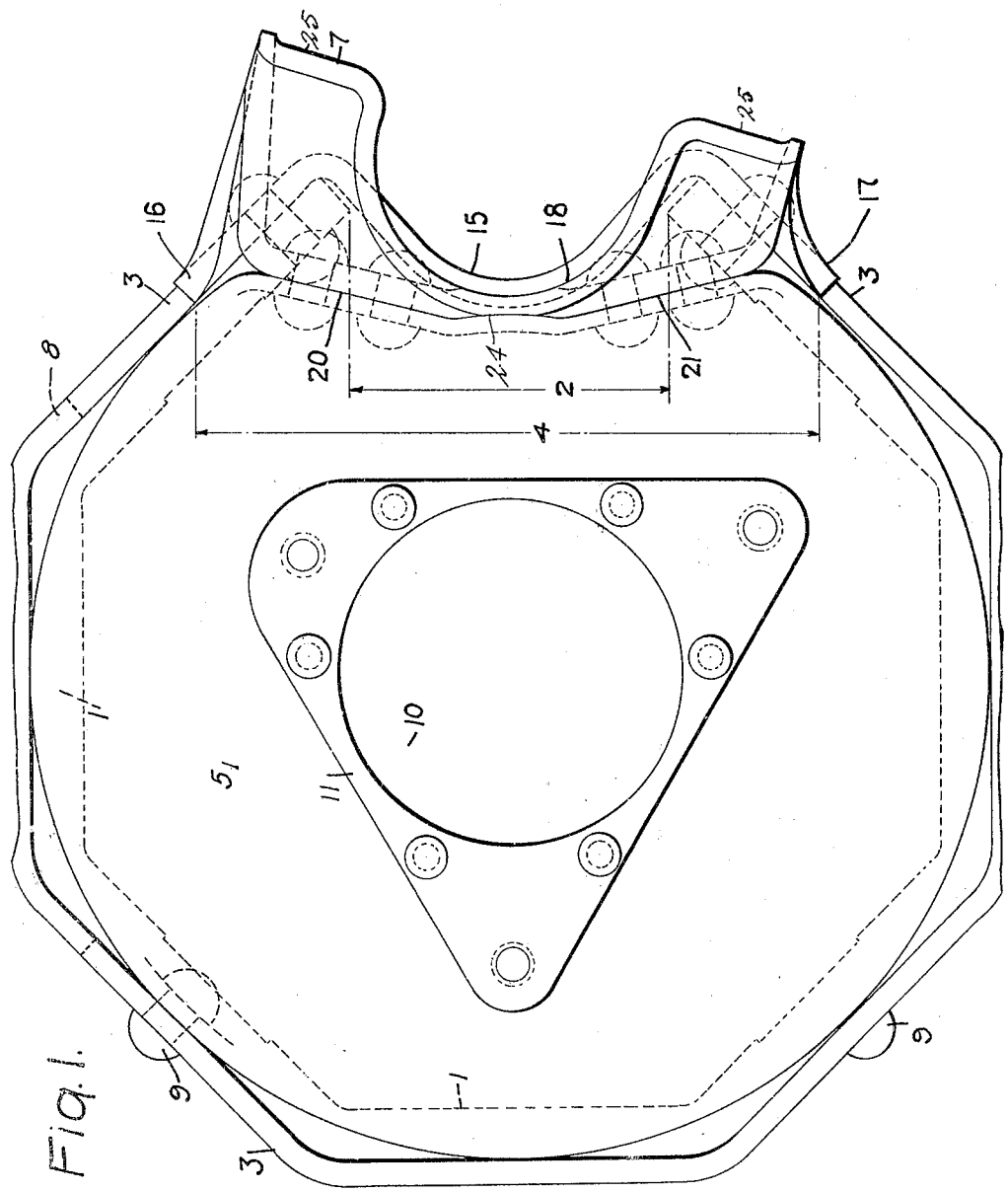

M. B. LAMBERT.
DYNAMO ELECTRIC MACHINE FRAME.
APPLICATION FILED SEPT. 5, 1916.

1,326,351.

Patented Dec. 30, 1919.
2 SHEETS—SHEET 1.

WITNESSES:
C. J. Ridge.
W. R. Coley

INVENTOR
Myles B. Lambert.
BY
Wesley G. Carr
ATTORNEY

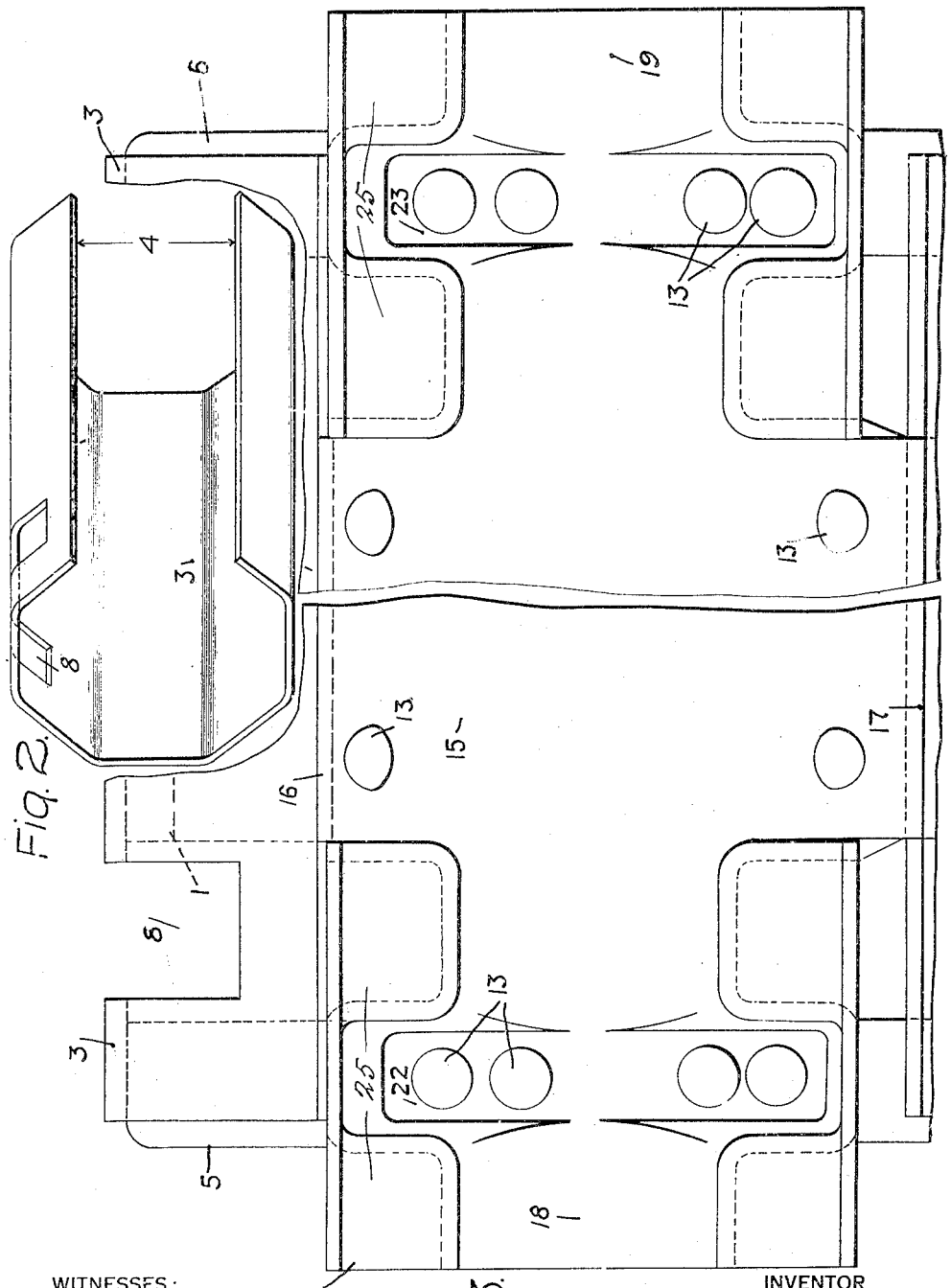# M. B. LAMBERT.
DYNAMO ELECTRIC MACHINE FRAME.
APPLICATION FILED SEPT. 5, 1916.
1,326,351. Patented Dec. 30, 1919.
2 SHEETS—SHEET 2.
WITNESSES:
R J Ridge
W R Coley
INVENTOR
Myles B. Lambert.
BY
Berley G Barr
ATTORNEY

UNITED STATES PATENT OFFICE.

MYLES B. LAMBERT, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC-MACHINE FRAME.

1,326,351.     Specification of Letters Patent.     Patented Dec. 30, 1919.

Application filed September 5, 1916. Serial No. 118,330.

*To all whom it may concern:*

Be it known that I, MYLES B. LAMBERT, a citizen of the United States, and a resident of Edgewood Park, in the county of Allegheny and State of Pennsylvania, have invented a new and useful Improvement in Dynamo-Electric-Machine Frames, of which the following is a specification.

My invention relates to dynamo-electric machines and especially to the construction of stator frames for electric railway motors and the like.

The object of my invention is to provide a structure of the above-indicated character, which shall be light in weight, and simple and inexpensive in construction, and which shall embody the necessary strength and mechanical protection of the motor parts while maintaining desirable electrical characteristics or properties of the machine.

I accomplish the end in view by the elimination of parts that are unnecessary for either mechanical or electrical reasons and thus obtain the ultimate weight reduction while providing sufficient magnetizable material to constitute a suitable magnetic circuit and to secure the necessary strength and ruggedness of parts, as well as to fully protect the internal parts of the motor from damage by external agencies. Wherever practicable, I have employed pressed-steel parts to secure maximum strength for minimum weight, as hereinafter more fully set forth.

More specifically stated, it is the object of my invention to provide a stator frame embodying a magnetizable yoke member having a gap between its edges, a pair of suitable end-rings, an enveloping member of relatively light weight material for the yoke member and end-rings, and having a gap that substantially registers with the other gap in the yoke member, and an axle bracket that is located in the duplex gap and is magnetizably associated with the yoke member and enveloping member to constitute a suitably dimensioned part of the main magnetic circuit.

This application is an improvement on a co-pending application of M. B. Lambert and C. W. Starker, Serial No. 121,417, filed Sept. 21, 1916, and assigned to the Westinghouse Electric & Manufacturing Company, in which is set forth and claimed a dynamo-electric machine frame embodying a yoke member similar to that herein described, together with end-rings, an axle-bracket and a plurality of suitable connecting members or tie-pieces for securing the various parts together. In the present application, therefore, I am claiming only points of difference over the invention set forth in the application just identified.

In the accompanying drawings, Figure 1 is a view in end elevation of a dynamo-electric machine frame constructed in accordance with my invention; Fig. 2 is a perspective view on a reduced scale of the enveloping member that is shown in Fig. 1; and Fig. 3 is a view in side elevation, with parts broken away, of the structure that is illustrated in Fig. 1.

Referring to the drawings, the structure shown comprises a suitable magnetizable band or yoke member 1, here shown as being substantially polygonal in form, and having a gap or opening 2, for a purpose to be described, between its confronting edges; an enveloping member 3 of greater length but smaller cross-section than the yoke member, having a gap or opening 4 between its confronting edges that substantially registers with the gap 2 in the yoke member 1; a pair of end-bells or end-rings 5 and 6 that are severally spaced from the ends of the yoke member 1, and which are located substantially flush with the outer ends of the enveloping member 3; and an axle-inclosing member or axle-bracket 7 that is located in the duplex gap 2, 4 and is suitably secured to the yoke member, the enveloping member and the end-rings, as subsequently described in detail.

The yoke member 1 is of relatively large cross-section that is suitable for constituting the main magnetic circuit of the machine and is adapted to receive a plurality of pole-pieces or polar projections (not shown), in accordance with customary practice. The yoke member is preferably formed of rolled-steel or other material of suitably high permeability, whereby the desired magnetic characteristics are provided with a minimum of space and weight requirements.

The enveloping member 3 closely fits around the yoke member 2, which is substantially centrally disposed with respect thereto, and is preferably provided in the top surface near one of its ends with a suitable opening 8 that corresponds to the usual opening in railway motors above the commutator cylinder.

The end-rings 5 and 6, preferably of pressed-steel or other light-weight material, may be of any appropriate shape and may be secured to the corresponding ends of the enveloping member 3 in any suitable manner, as by a plurality of rivets 9, or by spot-welding. It will be understood that the end-rings 5 and 6 may be of cylindrical or other configuration, to leave ventilating spaces between the enveloping member 3 and the respective end-rings, or the end-rings may be pressed into a shape that permits a relatively close fit between them and the enveloping member to provide substantially unbroken end-faces for the motor frame.

The end-rings 5 and 6 are severally provided with substantially centrally-disposed openings 10, the edges of which may be suitably reinforced by triangular or otherwise-shaped plate members 11, for the purpose of receiving the customary armature bearing-housings.

The axle-bracket 7 is disposed within the duplex gap 2, 4 and is of such dimensions that the necessary mechanical strength, as well as the requisite magnetic cross-section is provided. However, it will be found that the usual pressed-steel type of axle-bracket that has been previously employed with a continuous or complete yoke member will be suitable for use in the present machine frame without substantial alteration, and will provide the desired mechanical and electrical characteristics.

The axle-bracket 7, best shown in Fig. 3, is provided with an inner centrally-disposed surface 15 that is substantially cylindrical in form and which is prolonged by tongues or lugs 16 and 17, which are bent to respectively overlap the confronting edges of the yoke member 1, and abut against the corresponding edges of the enveloping member 3. The tongues or lugs 16 and 17 may be secured to the yoke member 1 in any suitable manner, as by a plurality of rivets 13.

The end-portions of the axle-bracket are also provided with cylindrical inner surfaces 18 and 19 for the purpose of receiving the brasses for supporting the truck axle, in accordance with a familiar practice.

The outer side of the axle bracket is provided near its respective ends with pockets 22 and 23 in the surfaces 18 and 19, respectively, the bottom portions of which form sloping flat surfaces 20 and 21 that abut against complementary surfaces 24 of the end-rings 4 and 5, respectively, to which the axle bracket may be secured by means of a plurality of the rivets 13 disposed in the pockets 22 and 23, or otherwise.

It will be observed by reference to Fig. 3 that the material is pressed into such shape that the pockets 22 and 23 are provided near the ends of the axle bracket and the cylindrical surface 15 constitutes a similar centrally disposed depression which has a length substantially equal to the width of the yoke member 1. The formation of the pressed-steel axle-bracket 7 forms no material part of my present invention, and it is believed that no further description thereof will be necessary here, as the essential features of the construction will be familiar to those skilled in the art being very similar to that shown and described in Patent No. 1,198,080. The axle bracket 7 is provided with outer flat surfaces 25 to which similar flat surfaces of a suitable axle cap (not shown) may be attached in any desired manner to complete the axle-receiving inclosure, the brasses being clamped between the inner cylindrical surface of the axle cap and the surfaces 18 and 19.

The structure shown thus comprises a centrally-disposed yoke member of suitable dimensions to constitute the main magnetic circuit of the machine and provided with a gap between its confronting edges, a pair of end-rings spaced apart from the yoke member and adapted to receive and support bearing housings, an enveloping member for the yoke member and the end-rings and an axle-bracket that is adapted to mechanically and magnetizably bridge the duplex gap in the yoke member and the enveloping member in such manner that the requisite strength and rigidity is imparted to the frame as a whole, and moreover, the magnetic circuit dimensions of the axle bracket are sufficient to form a substantially unrestricted path of relatively low magnetic reluctance for the main flux that traverses the motor frame.

In this way, I secure a dynamo-electric machine frame that is particularly light in weight, simple and inexpensive in construction and readily adaptable to all sizes of machines. Moreover, the weight reduction has been accomplished without sacrificing the electrical characteristics or desirable mechanical properties of the machine frame.

If it is desired to cover the opening 8 in the enveloping member 3, for the purpose of excluding dust or moisture from the interior of the machine, this opening may be closed by a suitable cover (not shown) preferably of sheet-steel, whereby the intended result may be obtained without adding any appreciable weight to the machine frame.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. A dynamo-electric machine frame comprising a magnetizable yoke member having a gap between its edges, a pair of end-rings, a magnetizable enveloping member for the yoke member and the end-rings, and having a corresponding gap, axle-inclosing means located in said gap, and magnetizable means for securing said axle-inclosing means to said members and to said end-rings.

2. A dynamo-electric machine frame comprising a magnetizable yoke member having a gap between its edges, a pair of end-rings spaced apart from the yoke member, a magnetizable enveloping member for the yoke member and the end-rings and having a gap that substantially registers with the other gap, an axle-bracket located in the duplex gap, and magnetizable means for securing said axle-bracket to said members and to said end-rings.

3. A dynamo-electric machine frame comprising a magnetizable yoke member having a gap between its edges, a pair of end-rings of relatively light weight material spaced apart from the yoke member, an enveloping member of relatively light-weight magnetizable material for the yoke member and the end-rings and having a gap that substantially registers with the other gap, an axle-bracket of suitable magnetic-circuit dimensions located in the duplex gap, and means for securing said axle-bracket to said members and to said end-rings.

4. A dynamo-electric machine frame comprising a yoke member having a gap between its edges, a pair of end rings spaced apart from the yoke member, an enveloping member for the yoke member and the end rings and having a gap that substantially registers with the other gap, an axle bracket located in the duplex gap, said yoke member and said enveloping member constituting a portion of a magnetic circuit, and means located in said gap completing said magnetic circuit and securing said axle bracket to said members and to said end rings.

In testimony whereof, I have hereunto subscribed my name this 31st day of August 1916.

MYLES B. LAMBERT.